(12) United States Patent
Trippel et al.

(10) Patent No.: US 11,953,049 B2
(45) Date of Patent: Apr. 9, 2024

(54) DECOUPLING ELEMENT FOR HEAT SHIELDS

(71) Applicant: Reinz-Dichtungs-GmbH, Neu-Ulm (DE)

(72) Inventors: Alexander Trippel, Wullenstetten (DE); Franz Schweiggart, Pfaffenhofen (DE); Johannes Koebele, Ulm (DE); Brian Heath, Ulm (DE); Giacomo Giaimi, Ulm (DE); Marc Sauter, Weissenhorn (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 388 days.

(21) Appl. No.: 17/211,726

(22) Filed: Mar. 24, 2021

(65) Prior Publication Data

US 2021/0301849 A1 Sep. 30, 2021

(30) Foreign Application Priority Data

Mar. 25, 2020 (DE) ...................... 20 2020 101 595.8

(51) Int. Cl.
*F16B 5/02* (2006.01)

(52) U.S. Cl.
CPC .......... *F16B 5/0241* (2013.01); *F16B 5/0258* (2013.01)

(58) Field of Classification Search
CPC ..... B60R 13/0876; F01N 13/00; F01N 13/10; F01N 13/102; F01N 13/14; F01N 13/148; F01N 13/1811; F01N 13/1855; F01N 13/1872; F01N 2260/20; F02B 77/11; F16B 5/0241; F16B 5/025; F16B 5/0258; Y10T 403/75

USPC ........................................................ 403/408.1
See application file for complete search history.

(56) References Cited

U.S. PATENT DOCUMENTS

| | | | | |
|---|---|---|---|---|
| 2,386,463 | A * | 10/1945 | Hile | F16F 3/0873 267/140.5 |
| 6,328,513 | B1 * | 12/2001 | Niwa | F16F 1/362 411/339 |
| 6,561,312 | B2 * | 5/2003 | Stanienda | F16B 5/0241 181/207 |
| 7,163,200 | B2 * | 1/2007 | Dickson | F16F 1/3735 267/293 |
| 7,261,365 | B2 * | 8/2007 | Dickson | B60G 99/002 296/190.07 |
| 7,416,174 | B2 * | 8/2008 | Dickson | F16F 3/093 267/141.1 |

(Continued)

FOREIGN PATENT DOCUMENTS

| | | | | |
|---|---|---|---|---|
| DE | 19916098 | A1 * | 10/2000 | ............ F16B 5/0258 |
| DE | 10063812 | A1 * | 6/2002 | ............ F16B 5/0258 |
| FR | 3068743 | A1 * | 1/2019 | ............ F16B 5/0258 |

*Primary Examiner* — Josh Skroupa
(74) *Attorney, Agent, or Firm* — McCoy Russell LLP (57) ABSTRACT

A decoupling element for fastening a heat shield. The heat shield comprising a passage opening for a fastener. The decoupling element comprising: a middle part containing a sleeve, a lower part arranged adjacent to the first axial end portion of the sleeve, a first damping element arranged on the second side of the first pressure absorption element, an upper part arranged adjacent to the second axial end portion of the sleeve, and a second damping element arranged on the second side of the second pressure absorption element.

18 Claims, 8 Drawing Sheets

(56) References Cited

U.S. PATENT DOCUMENTS

| | | | | |
|---|---|---|---|---|
| 8,939,437 B2* | 1/2015 | Kobori | .................. | F16F 1/3735 |
| | | | | 267/140.3 |
| 9,744,922 B2* | 8/2017 | Ostermeier | ......... | B60R 13/0876 |
| 10,458,281 B2* | 10/2019 | Tripodina | ............... | F01D 11/24 |
| 11,365,780 B2* | 6/2022 | Düll | ........................ | F16F 1/376 |
| 11,408,323 B2* | 8/2022 | Choi | .................. | F01N 13/1811 |
| 11,466,714 B2* | 10/2022 | Arndt | .................... | F16B 5/0241 |
| 11,542,971 B2* | 1/2023 | Heiselbetz | ............ | F16B 5/0241 |
| 2005/0040576 A1* | 2/2005 | Oxenknecht | .......... | F16F 1/3735 |
| | | | | 267/293 |
| 2013/0071203 A1* | 3/2013 | Hay | ..................... | F16B 5/0241 |
| | | | | 411/111 |
| 2018/0313378 A1* | 11/2018 | Glauber | ................ | F16B 5/0241 |

* cited by examiner

DECOUPLING ELEMENT FOR HEAT SHIELDS

CROSS-REFERENCE TO RELATED APPLICATION

The present application claims priority to German Utility Model Application No. 20 2020 101 595.8, entitled "DECOUPLING ELEMENT FOR HEAT SHIELDS," and filed on Mar. 25, 2020. The entire contents of the above-listed application are hereby incorporated by reference for all purposes.

TECHNICAL FIELD

The present disclosure relates to a decoupling element for fastening a heat shield to a component, and to a heat shield which contains such a decoupling element.

BACKGROUND AND SUMMARY

Heat shields serve for example in the case of engines of motor vehicles, such as in the region of the exhaust-system branch, for protecting high-temperature-sensitive components and units which are located close to hot components from impermissible heating. In this case, the heat shields also furthermore improve the sound insulation. It should be noted in this case that noise transmission and heat transmission from the component to the heat shield is to be minimized at the fastening points of the heat shield to a component. This prevents the heat shield from being impermissibly heated at the fastening points themselves and being unable to perform its intended function.

Components of the exhaust-system branch, e.g. exhaust manifolds, catalytic converters etc., or alternatively the engine block, the valve cover or alternatively another heat shield may be cited as an example here and in the following as components.

Usually, such heat shields are three-dimensionally shaped structural components which have at least one, but often also further, metallic sheet metal layers. The three-dimensional form of the at least one metallic sheet metal layer in this case usually results from the shape of the components which are to be shielded from each other and the distance between them.

The heat shield is usually attached to the component by means of a point-wise connection. To this end, the metallic sheet metal layer or the plurality of metallic sheet metal layers of the heat shield may have at least one passage opening which passes through all the layers of the heat shield, and which can receive a fastening element. For example, screws, bolts, pins with transverse bolts or rivets serve as fastening elements.

At these fastening points, however, vibrations from the component, and in the case of fastening to a hot component also heat, can be transmitted into the heat shield via the fastening element. Therefore, the fastening element may be insulated or damped as far as possible relative to the component or relative to the adjacent metallic sheet metal layer or the adjacent metallic sheet metal layers of the heat shield through which it penetrates.

Usually, therefore, a decoupling element, for example a decoupling element with a knitted wire mesh as damping element, is arranged between the fastening element, discussed below with reference to the example of a screw, and the sheet metal layer of the heat shield which is breached by the screw. Usually, the decoupling element is fastened directly to the sheet metal layer of the heat shield, so that when the heat shield is being mounted on the component the worker merely has to hold the fastening element, for example the screw, together with the heat shield against the component and then has to connect the heat shield and the component together.

Due to this firm fastening of the decoupling element to the sheet metal layer of the heat shield, the decoupling element is not movable relative to the heat shield.

Heat shields are however frequently mounted on different components of an exhaust system. These have attachment points which may have very large tolerances between the individual components, for example between the turbocharger and catalytic converter.

Owing to the fact that the decoupling element is coupled firmly with the metallic layer of the heat shield, it however specifies the attachment points, i.e. the feed-through opening for the fastening element, so that such a heat shield cannot compensate for tolerances at the attachment points on sides of the component.

Therefore, variability of the position of the passage openings of the damping elements on the heat shield is necessary.

The object of the present disclosure is therefore to make available a decoupling element and a heat shield equipped therewith which compensates for a large tolerance of the fastening points of the components.

This object is achieved by the decoupling element according to the present disclosure.

The decoupling element according to the present disclosure is now constructed from at least the following elements.

Firstly, it has a sleeve as the middle part, the sleeve having a first and a second axial end portion.

On either side of the first and the second axial end portion of the sleeve there is arranged a lower part or an upper part, respectively. The lower part has a first pressure absorption element and a damping element, the damping element being arranged starting from the pressure absorption element in the direction of the second axial end portion of the sleeve. The upper part likewise has a pressure absorption element and a second damping element which is arranged on the side, directed to the first axial end portion, of the second pressure absorption element. The decoupling element can thereby enclose a sheet metal layer of a heat shield between the two damping elements and thus decouple the sleeve of the decoupling element radially, but above all the upper part and the lower part axially, from the sheet metal layer of the heat shield.

According to embodiments of the present disclosure, the decoupling element now has a plurality of, but at least one, locking disc(s), which is/are arranged on the second side of the second pressure absorption element. The locking disc then has such a cross-section that it surrounds the sleeve, but with the diameter of the passage opening in the locking disc, at least in portions, being smaller than the diameter of the sleeve.

This means that the locking disc can be secured on the sleeve and in this manner the upper part can be secured on the sleeve.

With such a decoupling element, it is possible to pre-mount the decoupling element on the sheet metal layer of a heat shield, but with the locking disc being merely clamped fast on the sleeve. It is possible to displace the decoupling element laterally in an opening in the heat shield through which the decoupling element extends, in the plane of the metallic layer of the heat shield, but at the same time the decoupling element remains fastened in a captive manner to the heat shield.

The clamping force of the decoupling element on the metallic layer of the heat shield can be set such that the displacement force in the plane of the metallic layer of the heat shield through which the element passes does not exceed a maximum value, such as a value of 50 N.

Embodiments of the decoupling element according to the present disclosure therefore make it possible for the opening in the metallic layer of the heat shield into which the decoupling element can be or is inserted to have a large diameter compared with the external diameter of the sleeve of the decoupling element, for example as a through-hole with a larger diameter or as an elongate hole. This makes possible displaceability of the attachment point in the heat shield dependent on the attachment points of the component to which the heat shield is to be fastened. At the same time, the captive holding of the decoupling element and the easy displaceability thereof on the heat shield by hand is guaranteed.

Due to the adjustable clamping force of the decoupling element on the metallic layer of the heat shield, the decoupling element is decoupled axially in the direction of the passage opening through the metallic layer at the attachment point. Due to the use of the damping elements on both sides, above all due to the embodiment of the lower damping element, radial decoupling is also brought about.

Given a suitable configuration of the decoupling element, it may completely cover the passage opening for the fastening element in the heat shield on one side or on both sides and thereby prevent passage of media through the passage opening in the metallic layer.

Embodiments of the locking discs may be formed as a pot with a base surfaces and walls protruding therefrom at an incline or substantially perpendicularly. Such a locking disc furthermore prevents the passage of media, for example water or oil, through the fastening opening in the metallic layer of the heat shield.

The upper part and the lower part of the decoupling element are displaceable relative to each other in the axial passage direction of the passage opening through the sleeve in embodiments of the disclosure. This firstly makes it possible to set the clamping force on the metallic layer, and secondly, when mounting the heat shield on the component, in the position of the decoupling element and the fastening element then selected, by tightening the fastening element, for example a screw, to clamp the decoupling element firmly between the fastening element and the component and thus to fix the heat shield in its final position.

Embodiments of the decoupling element according to the present disclosure make it possible for the decoupling element to be displaceable after insertion into the metallic layer of the heat shield and prior to fastening the heat shield to the component, since the upper and lower part and also middle part of the decoupling element are only loosely fitted together and are fixed together by way of the force between the locking disc and the sleeve. Upon bracing or tightening of the fastening element the initial tension for fastening the heat shield to the structural element is produced.

The pressure absorption elements of the upper part and the lower part, executed for example in the form of a disc or a flange, which may also be fastened to the sleeve or configured in one part therewith, make possible a maximum contact area even for small heads of a fastening element, for example screw heads. Furthermore, the decoupling element may be configured such that different fastening elements can also be used. Thus it is possible with the same decoupling element, given an appropriate configuration of the passage opening through the decoupling element, to use screws of different dimensions, e.g. M6 or M8 screws or alternatively rivets. The locking disc may in this case at least largely or completely cover the gap between the sleeve and the inner peripheral edge of the passage opening in the metallic layer of the heat shield and thus prevent passage of liquids such as oil through the passage opening in the metallic layer.

Merely low mounting forces are necessary for mounting the heat shield with the decoupling element according to the present disclosure. Costly mounting steps such as for example hem-edging processes etc. are not necessary.

Damping elements frequently include knitted wire meshes, the wires of which can dig into the metallic layer of the heat shield. With suitable axial positioning of the locking discs, e.g. between the metallic layer of the heat shield and an adjacent damping element, the metallic layer of the heat shield is separated from the damping elements. Due to the separation between the metallic layer of the heat shield and the damping elements, the wires of the knitted wire meshes of damping elements are prevented from digging into the metallic layer of the heat shield.

Embodiments of the lower part and upper part have a locking disc. The locking disc may be arranged directly between the metallic layer of the heat shield and the respective adjacent damping element. An arrangement of the locking disc within the damping element or between the pressure absorption element and the damping element in each case of the lower part and/or the upper part is also possible.

As already mentioned, the diameter of the passage opening in the respective locking disc, at least in portions, is less than the external diameter of the sleeve. This may firstly mean that the respective locking disc, merely in certain portions on its inner peripheral edge along the passage opening, has protrusions inwards, the internal diameter of which is less than the external diameter of the sleeve. This then leads to the locking disc being able to be clamped, latched etc. with the sleeve on these protrusions.

Furthermore, it is possible for the ratio between the internal diameter of the respective locking disc and the external diameter of the sleeve not to have to be as described above over the full length of the sleeve in the axial passage direction thereof. For example, it is possible for the sleeve, at least axially along its outer periphery, to have in portions, running around the passage opening, grooves into which the locking disc can engage. Then the external diameter of the sleeve merely outside the respective grooves is greater than the internal diameter of the locking disc. Within the groove, the locking disc may be inserted loosely relative to the sleeve, i.e. the external diameter of the base of the groove in the sleeve is less there than the minimum internal diameter of the locking disc. In this manner, the locking disc can be clamped, latched or otherwise connected by a positive lock to the sleeve in the axial passage direction of the sleeve. The positive lock in this case is merely in the direction of the pressure absorption element belonging to the respective locking disc. Such a configuration of the locking disc and the sleeve makes it possible to secure both of them relative to each other and in this manner to mount the decoupling element in a captive manner on or in the metallic layer of the heat shield.

Alternatively or additionally, the sleeve may also have, axially along its outer periphery, running around the passage opening, optionally also only in portions, one or more grooves, the depth of which varies over the outer periphery. The corresponding locking disc(s) can then be configured such that it/they engage(s) merely in the deeper regions of the respective groove.

If the locking disc is connected by a frictional lock or by a positive lock, for example clamped, to the outer periphery of the sleeve, the inner edge of the locking disc may also be offset or bent.

At least one of the damping elements may according to the present disclosure—at least in the mounted state of the decoupling element or the heat shield on the component—extend through the metallic layer of the heat shield and thus insulate the metallic layer from the sleeve.

The pressure absorption elements may in each case also be configured such that one of the pressure absorption elements is formed in one part with the sleeve and forms for example a flange on the sleeve. They may furthermore have on their outer edge a collar projecting in the direction of the adjacent damping element in each case and/or protrusions or hooks projecting in the direction of the damping element which is adjacent in each case, which collar, protrusions or hooks engages or engage over the adjacent damping element externally, so that the pressure absorption element limits or specifies the adjacent damping element in its mobility not only axially but also radially.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Below, some examples of decoupling elements and heat shields according to the present disclosure are given. Therein, discussion of repeated reference numerals is not repeated.

In the following examples, optional features are realized. It is however also possible to realize individual features of the decoupling elements and heat shields described below by way of example individually or in any combination whatsoever with other optional features of the same example or the other examples.

BRIEF DESCRIPTION OF THE FIGURES

FIGS. 1A-4 show a first embodiment of a heat shield and decoupling element according to the present disclosure.

FIGS. 1A-10D are shown approximately to scale.

DETAILED DESCRIPTION

Figures 1A, 1B:
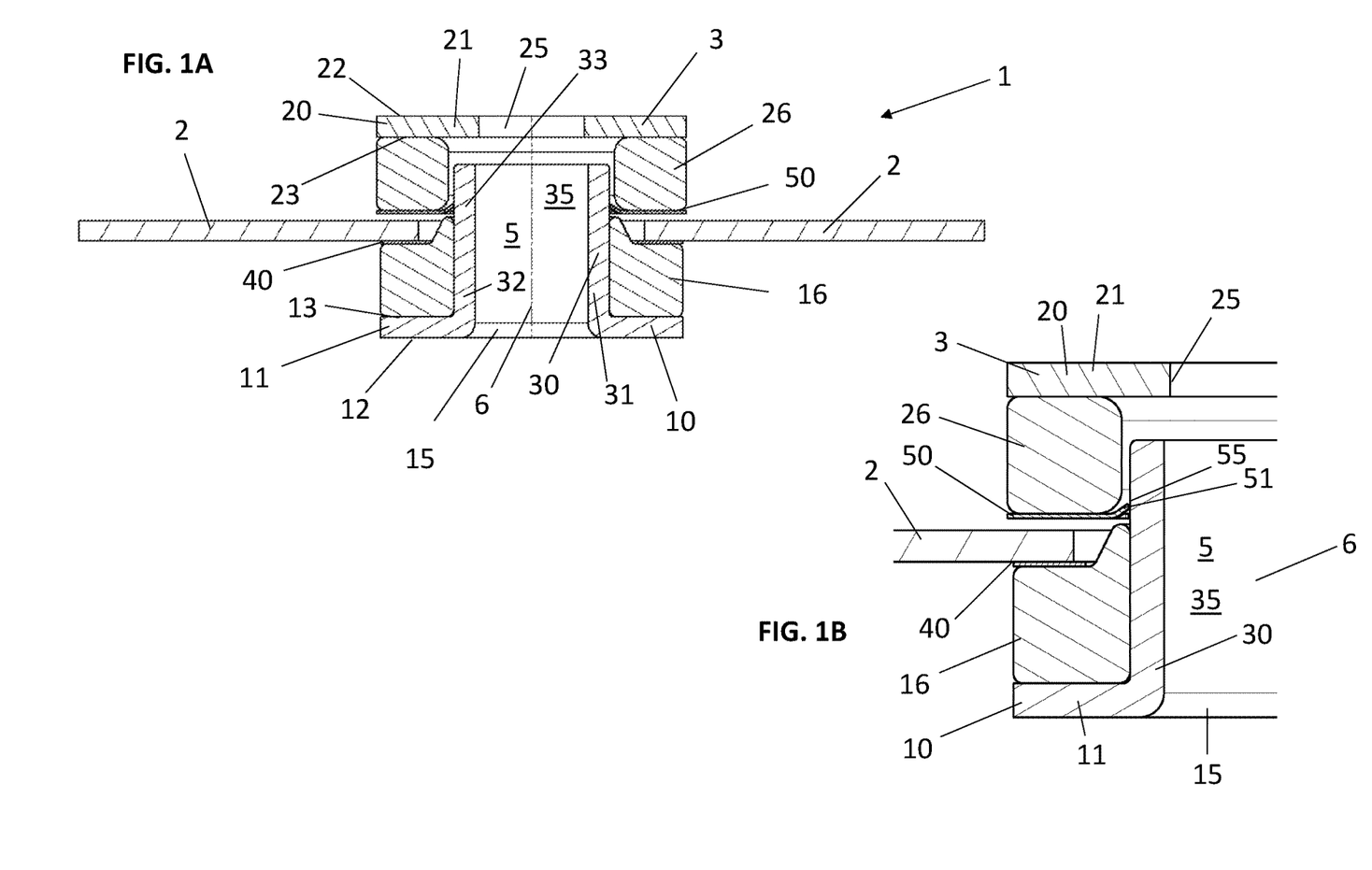

FIGS. 1A and 1B show a heat shield 1 according to the present disclosure with a metallic layer 2. The heat shield has a passage opening 5 through the entire heat shield, in which opening a decoupling element 3 in accordance with the present disclosure is arranged. The passage opening therefore also extends through the decoupling element 3. The axial direction of the passage opening 5, i.e. the passage direction, is marked with the reference numeral 6.

The decoupling element 3 has the following three elements: a lower part 10, an upper part 20 and a middle part 30. The upper part 20 has a pressure absorption element 21 in the form of a disc which runs around the passage opening 5, which extends as a passage opening 25 into the disc 21. The disc 20 has a first side 22 facing outwards and a second side 23 facing the metallic layer 2. Adjacent to the disc 20 on the second side and hence directed to the metallic layer 2 there is arranged on the disc 20 a damping element 26 in the form of a knitted wire mesh. On that side of the knitted wire mesh 26 which faces away from the disc there is arranged a locking disc 50 which extends across the entire space between the metallic layer 2 and the damping element 26 up to the middle part 30 and has running around the latter a bent edge 51.

FIG. 1A is an overall view in detail and cross-section through the heat shield 1, while FIG. 1B illustrates a detail of FIG. 1A.

The decoupling element has a lower part 10 which likewise has a pressure absorption element 11 in the form of a disc. Symmetrically to the upper part 20, the disc 11 of the lower part 10 has a first side 12 which faces away from the metallic layer 2. Furthermore, it has a second side 13 which is oriented towards the metallic layer. This pressure absorption element on its second side is next to a damping element 16 in the form of a knitted wire mesh. This knitted wire mesh 16 extends beyond the passage opening 5 in the metallic layer 2 up to the other side of the metallic layer 2 and thus decouples the metallic layer 2 from a middle part 30 in the form of a sleeve 31 which breaches the passage opening 5.

The lower part 10 furthermore likewise has a disc 40 which runs completely around the passage opening 5. This disc 40 does not have any region extending up to the middle part 30, and therefore does not clamp or latch with the sleeve 30. Rather, this disc 40 serves for separation between the sheet metal layer 2 of the heat shield and the knitted wire mesh of the damping element 16. It thereby prevents the wires of the knitted wire mesh from digging into the sheet metal layer 2.

The locking disc 50 is configured such that it has alternately regions set back from the sleeve 31 and protrusions 52a to 52i projecting in the direction of the sleeve in the form of lugs, the lugs extending as far as the sleeve 31 and having bent edges 51. In the section illustrated in FIG. 1A and FIG. 1B, the section passes through regions of the locking disc 50 with such lugs.

According to the present disclosure, the sleeve 31 then has a passage opening 35 as part of the passage opening 5, which extends from a first side 32 to a second side 33. The passage opening 35 together with the passage openings 25 through the upper part and 15 through the lower part is provided for a fastening means, for example a screw, to pass through. Upon tightening the screw, the disc of the pressure absorption element 11 can come to lie on a component and the disc of the pressure absorption element 21 can lie against a screw head. The two pressure absorption elements 11 and 21 consequently serve for connecting the heat shield 1 by a force lock to a component.

The pressure absorption element 11 is formed here as a flange in one piece with the sleeve 31.

The mounting of the decoupling element 3 then takes place in that first the sleeve 31 and the lower part 11 are passed through the passage opening 5 in the metallic layer of the heat shield and then the upper part 20 is drawn over the sleeve 31. The locking disc 50 in so doing clamps with the sleeve 31 and thus results in firm but movable pre-mounting of the decoupling element 3 on the metallic layer 2 of the heat shield 1. Upon mounting, this decoupling element can then be readily displaced laterally. Only once the fastening means which is to be passed through the opening 5 has been tightened are the lower and upper part of the decoupling element pressed together and the decoupling element 3 finally secured in the opening 5 in the metallic layer 2.

Figure 2:
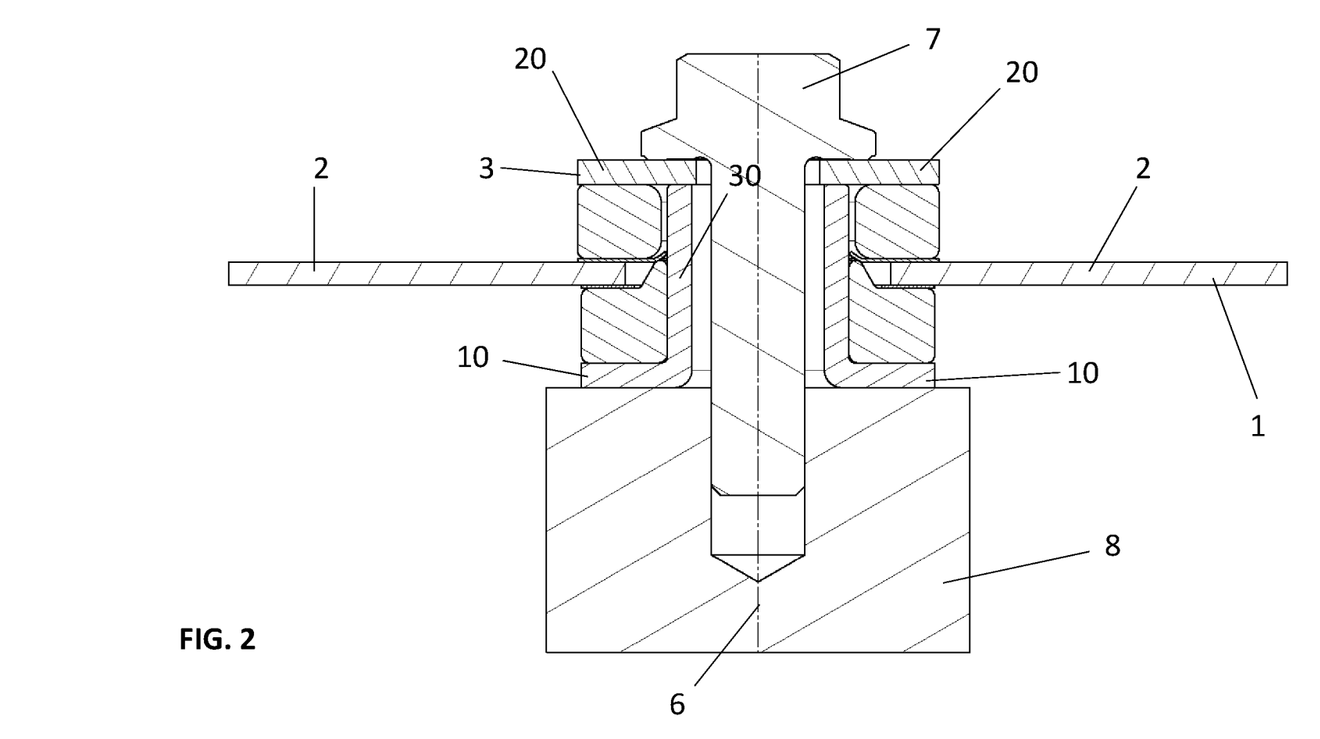

FIG. 2 shows the heat shield 1 of FIGS. 1A and 1B, but now fastened to a structural element 8 by means of a screw 7. The lower part 10 and upper part 20 are now pressed firmly together and thus secure the metallic layer 2 of the heat shield.

Figure 3:
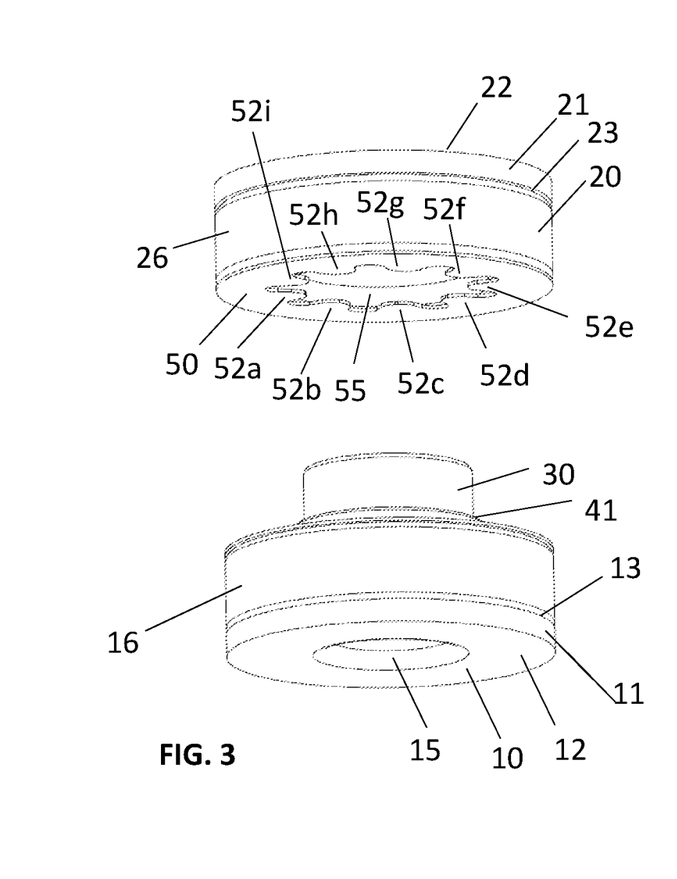

FIG. 3 shows an exploded view with lower part 10, sleeve 30 and upper part 20, with the lower part 10 and sleeve 30 being illustrated together.

The locking disc 50 of the upper part 20 is illustrated in FIG. 3 in an oblique view. Along its peripheral edge of the locking disc 50 running around the passage opening 55 in the locking disc 50, the latter has protrusions 52a to 52i projecting radially inwards, which upon placing on the lower part 10 illustrated clamp with the sleeve 30. For the protrusions 52a to 52i are configured such that they protrude further into the passage opening 55 than the external diameter of the sleeve 30 would make it possible to do without clamping.

Figure 4:
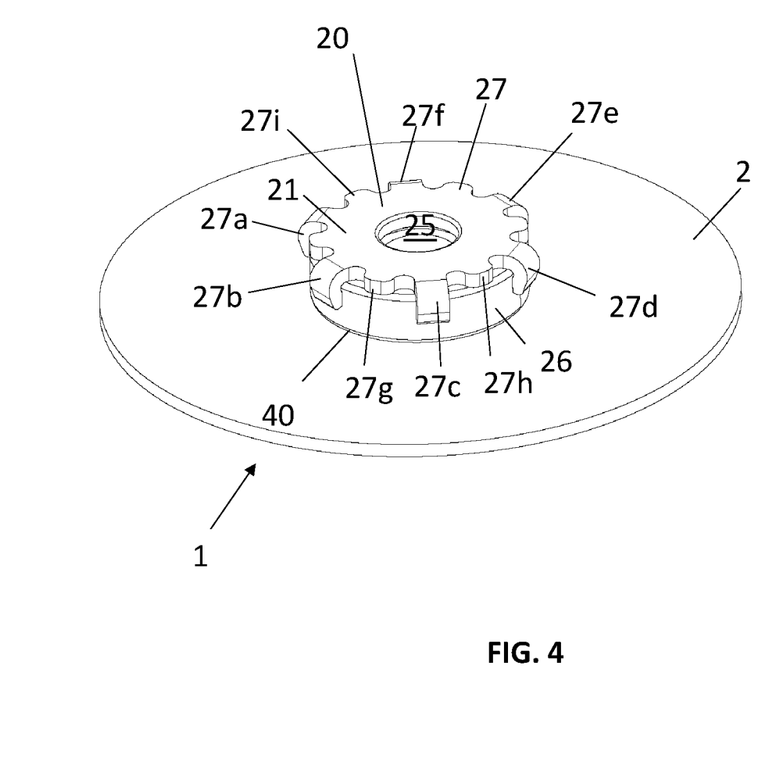

FIG. 4 shows a top view of a further heat shield 1 with a metallic layer 2 in an oblique top view. The upper part 20 has a pressure absorption element 21 in the form of a disc which has on its outer edge protrusions 27a to 27h, not all the protrusions being provided with reference numerals here. The protrusions project by different amounts radially towards the outside. For example, the protrusion 27g or the protrusion 27h protrudes merely in the radial direction across the damping element 26, whereas the protrusions 27a to 27f protrude first in the radial direction across the disc 21 and then are angled at an angle of ≤90° in the direction of the damping element and encompass the damping element 26 on the outside. As a result, the damping element 26 is secured further.

Figure 5:
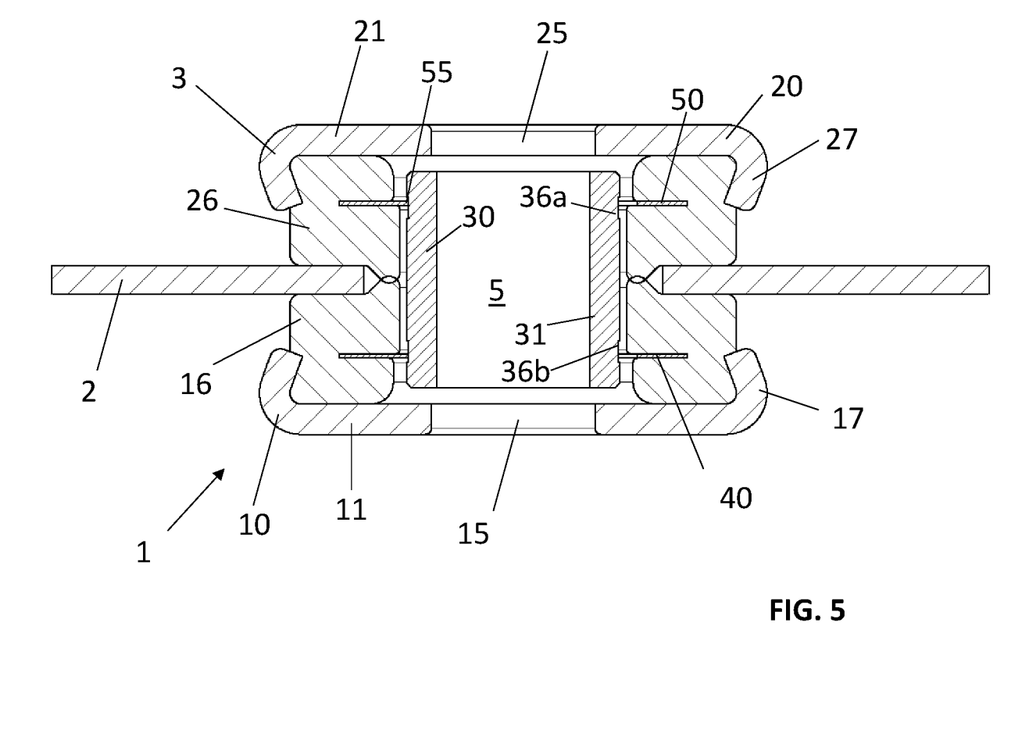
FIGS. 5-9 show a further example of a heat shield or decoupling element according to the present disclosure.

FIG. 5 shows a further example of a heat shield 1 according to the present disclosure with a metallic layer 2 and a decoupling element 3. In this embodiment with lower part 10, upper part 20 and middle part 30, in a departure from the example in FIGS. 1A and 1B the discs 40 and 50 are arranged not between the respective damping elements and the metallic layer 2, but arranged in a region between the pressure absorption element 11 and the metallic layer 2 or the pressure absorption element 21 and the metallic layer 2 respectively, partially within the respective damping element 16 or 26. Unlike in FIGS. 1A and 1B, here the disc 40 also has a locking function. The locking discs 40 and 50 in this case project inwards in the radial direction so far that they engage in grooves 36a or 36b respectively provided for this, running around the sleeve 31 of the middle part 30. As a result, the lower part and upper part in each case are secured by a positive lock on the sleeve 31 in the axial direction of the passage opening 5.

As in the previous example of FIG. 4, the pressure absorption elements 11 and 21 then have projections 17 or 27 respectively, which laterally engage over the respective adjacent damping elements 16 and 26.

The damping elements 16 and 26 protrude in each case into the passage opening 5 within the metallic layer 2, so that they insulate the metallic layer 2 from the sleeve 31.

Figure 6A:
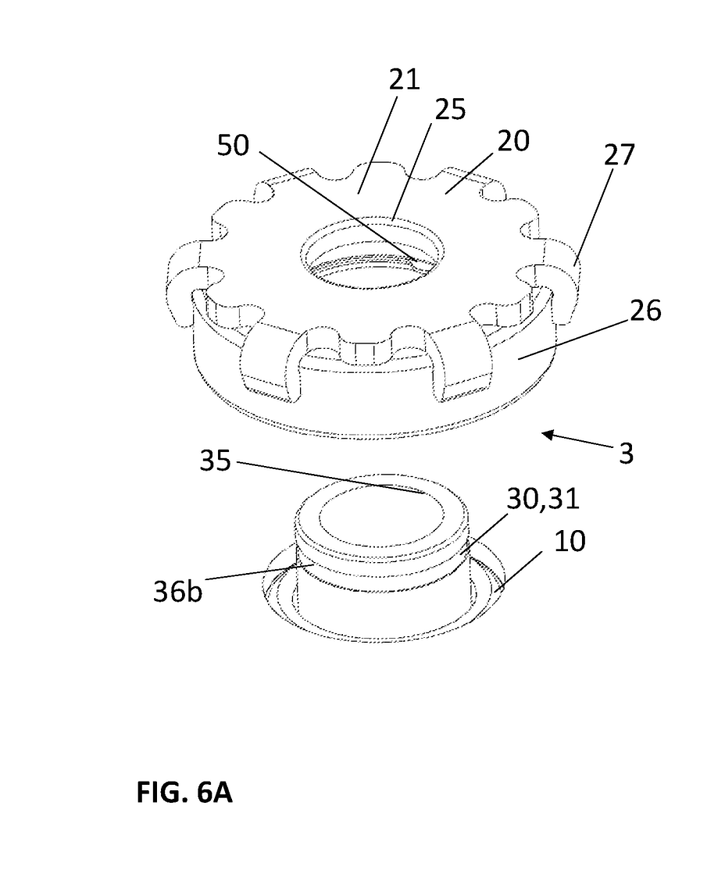
Figure 6B:
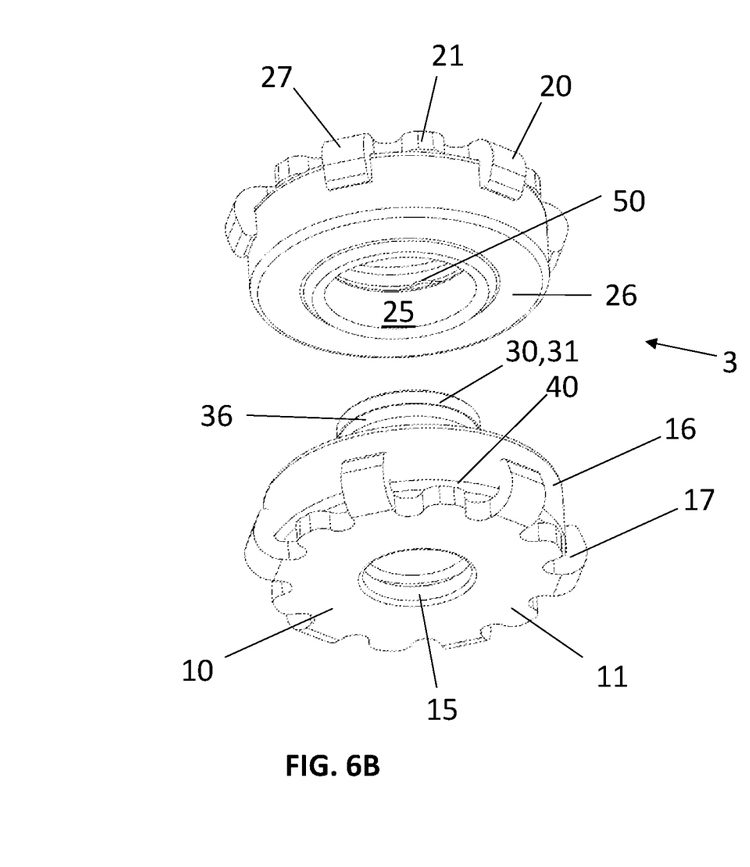

FIGS. 6A and 6B depict a top view or bottom view respectively of an exploded view of the decoupling element 3 of FIG. 5. In FIG. 6A the sleeve 30, 31 is illustrated. The marked reference numerals designate the same parts as those in FIG. 5.

Figure 7:
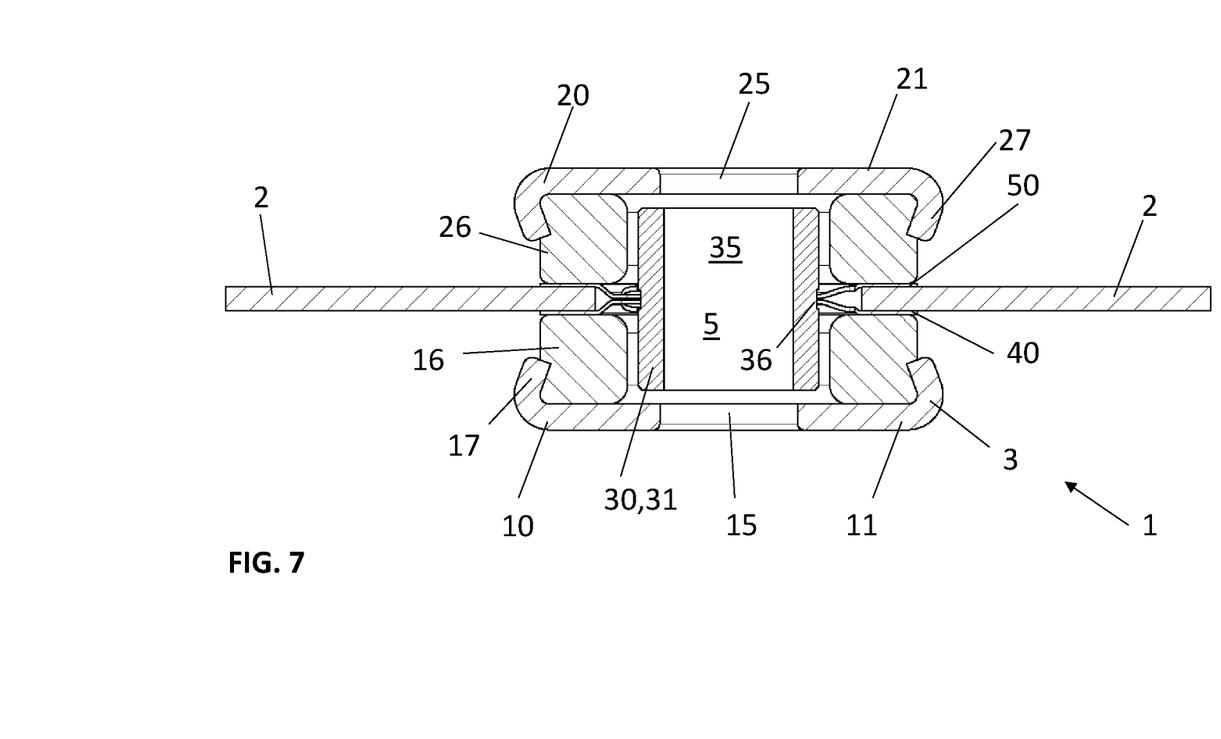

FIG. 7 shows a further embodiment of a heat shield 1 according to the present disclosure with a metallic layer 2 and a decoupling element 3.

The decoupling element 3 of FIG. 7 largely corresponds to that of FIG. 5, but with the locking discs 40 and 50 now being offset in each case in direction to each other and running around the passage opening 5. The inner peripheral edges of the locking discs 40 and 50 lie close by each other and engage in an individual groove 36 running around the sleeve 31 on the outside thereof. The groove 36 does not have to be completely encircling: rather, it is sufficient to provide the groove in regions in those regions in which the locking discs 40 and 50 extend into the groove, for example if the locking discs 40 and 50 have projections in portions merely along the peripheral edge, which projections have an internal diameter around the passage opening which is less than the external diameter of the sleeve 31 outside the groove 36.

Figure 8A:
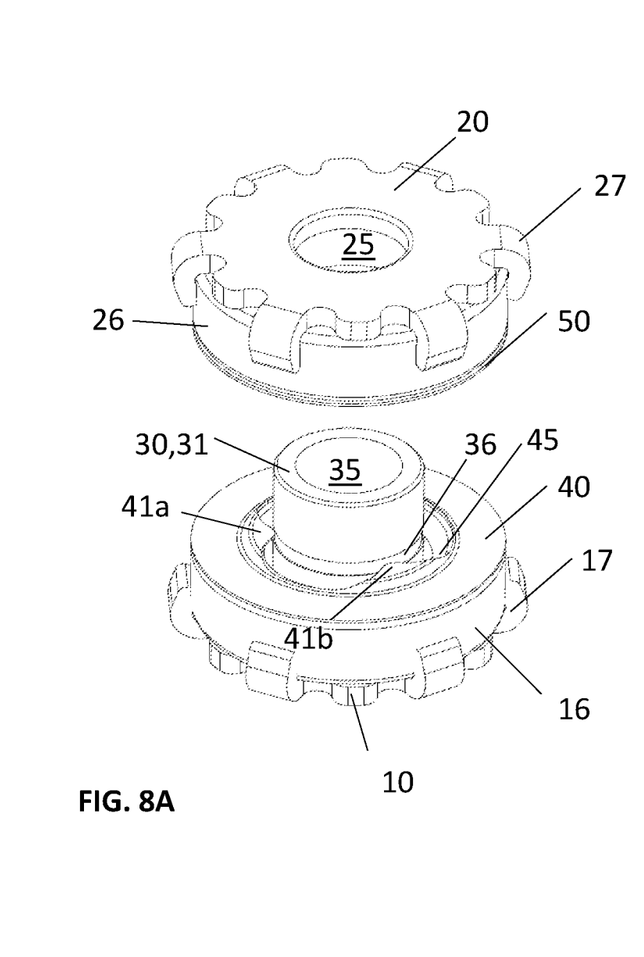
Figure 8B:
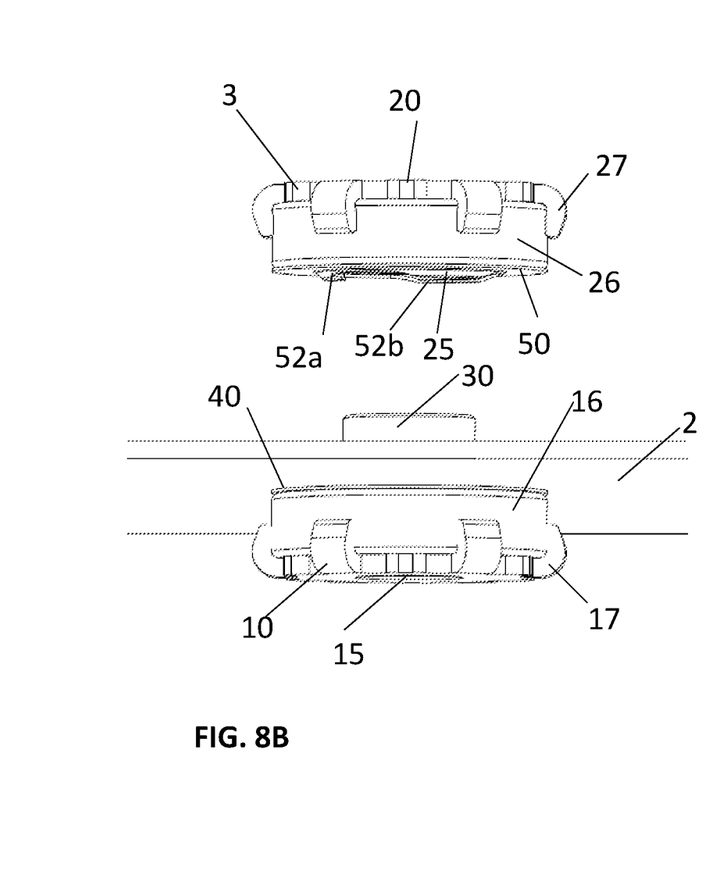

FIG. 8A shows an oblique view of the decoupling element of FIG. 7. In FIG. 8B a transverse view of the decoupling element is illustrated as an exploded view of the decoupling element 3, with the lower part 10 and the sleeve 30 partially extending through the metallic layer 2.

In FIG. 8A it is shown that the groove 36 is configured completely running around the outer surface of the sleeve 31. Into this groove engage projections 41a, 41b of the locking disc 40.

Figure 9:
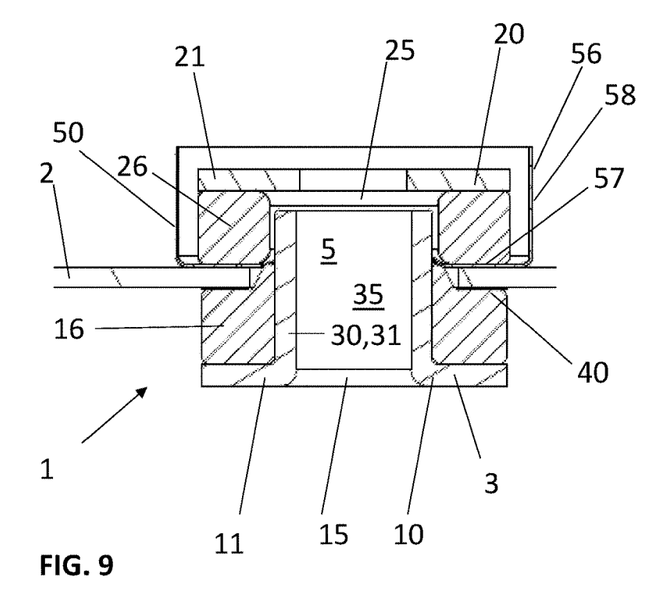

FIG. 9 shows a further example of a heat shield according to the present disclosure and a decoupling element 3 according to the present disclosure. The decoupling element in FIG. 9 is largely configured like the one in FIG. 1A. However, the locking disc 50 is now in the form of a pot 56 with a base 57 and walls 58, with the base 57 corresponding to the locking disc 50 of FIGS. 1A and 1B.

Due to the configuration of the locking disc 50 as a pot 56, it is possible to prevent liquids, such as for example water or oil, from passing through the passage opening 5 in the gap between the metallic layer 2 and the damping element 16.

FIGS. 10A to D show a total of 3 different embodiments of a damping element 3 similar to the one in FIG. 1. Unlike in FIGS. 1A and 1B, however, no disc 40 is present and the damping element 16 does not extend into the region between the metallic layer 2 and the sleeve 30.

Figure 10A:
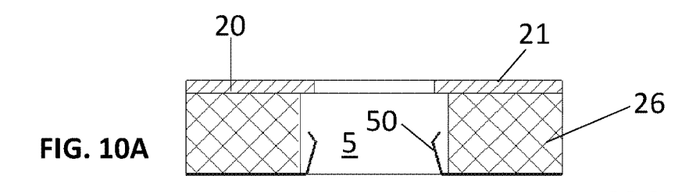
FIGS. 10A-D show a further example of a heat shield and decoupling element according to the present disclosure.
Figure 10B:
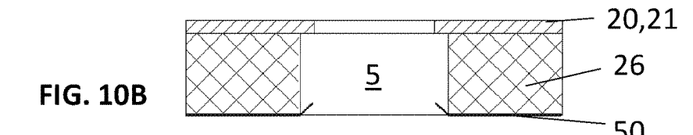
Figure 10C:
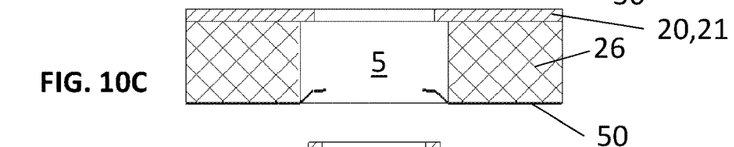
Figure 10D:
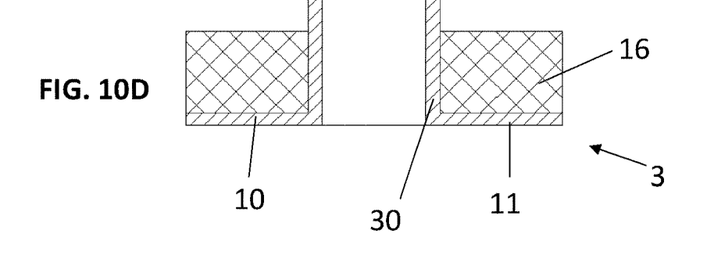

FIG. 10D shows the lower part 10 suitable for all the embodiments of FIG. 10A to 10C. It has a pressure absorption element 11 and a damping element made of knitted wire mesh 16. The middle part in the form of a sleeve 30 is configured in one part with the pressure absorption element 11.

FIGS. 10A to 10C now show three different variants of an upper part 20 with pressure absorption element 21, damping element 26 made of knitted wire mesh and locking disc 50.

The three variants of FIGS. 10A to 10C differ merely in the configuration of the inner edge of the locking disc 50. This is bent twice in the same direction in FIG. 10A, so that the kink between the first and the second bent edge forms a contact region on the sleeve 30. This double bent edge prevents damage to the sleeve 30. This contact region has resilient properties and in this manner holds the upper part 20 on the sleeve 30 with sufficient but not overly great force.

In FIG. 10B the locking disc 50 is bent singly as in FIG. 1A and FIG. 1B.

In FIG. 10C the locking disc 50 is likewise bent twice, albeit in opposite directions.

In all three variants of FIGS. 10A to 10C, the contact region of the locking disc 50 on the sleeve 30 is offset out of the plane of the adjacent regions of the sliding disc 50 in the axial direction of the passage opening 5.

FIGS. 1A-10D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A decoupling element for fastening a heat shield:
   the heat shield comprising a passage opening for a fastener and has an axial passage direction; and
   the decoupling element comprising:
      a middle part containing a sleeve with a first and a second axial end portion,
      a lower part arranged adjacent to the first axial end portion of the sleeve, with a first pressure absorption element which, along the axial direction, has a first side for resting against a component or a part of a fastening element, and a second side located opposite the first side,
      a first damping element arranged on the second side of the first pressure absorption element,
      an upper part arranged adjacent to the second axial end portion of the sleeve, with a second pressure absorption element which, along the axial direction, has a first side for resting against a component or a part of a fastening element, and a second side located opposite the first side, and
      a second damping element arranged on the second side of the second pressure absorption element, and a locking disc which is arranged on the second side of the second pressure absorption element; and
      the fastener passing through the lower part, the middle part, the upper part, the first damping element, and the second damping element;
      wherein at least in one portion of the sleeve along the axial direction, the external diameter of a cross-section of the sleeve perpendicularly to the axial direction, at least along the outer edge of the passage opening, is larger, completely or in portions, than the internal width of the passage opening in the locking disc, and the locking disc has protrusions which extend radially inward toward the sleeve and are bent away from a plane of the locking disc.

2. The decoupling element according to claim 1, wherein the first pressure absorption element is formed as a flange of the sleeve which extends radially towards the outside.

3. The decoupling element according to claim 1, wherein the lower part has a further locking disc which is arranged on the second side of the first pressure absorption element, wherein at least in one portion of the sleeve along the axial direction has an external diameter of a cross-section perpendicularly to the axial direction, at least along the outer edge of the passage opening, being larger in portions than the internal width of the passage opening in the further locking disc.

4. The decoupling element according to claim 1, wherein the locking disc is arranged on a side of the respective adjacent damping element which faces away from the respective second side of the pressure absorption element or an outer edge of the locking disc is arranged in the respective damping element.

5. The decoupling element according to claim 1, wherein the inner edge of the passage opening in at least one of the locking discs, at least in portions, is bent and/or offset, running around the passage opening.

6. The decoupling element according to claim 1, wherein at least one of the locking discs is latched in a groove running around the sleeve at least in portions.

7. The decoupling element according to claim 1, wherein the damping element of the lower part extends in the axial direction, partially or completely, as far as the locking disc of the upper part, and/or the damping element of the upper part extends in the axial direction, partially or completely, as far as a further locking disc of the lower part.

8. The decoupling element according to claim 1, wherein the sleeve and the first pressure absorption element of the lower part are connected together, and are produced in one piece or connected together by a material-formed bond.

9. The decoupling element according to claim 1, wherein the first pressure absorption element has on its radial outer edge a collar projecting in the direction of the first damping element and/or one or more hooks projecting in the direction of the first damping element, which collar or one or more hooks engage around the first damping element, and/or
the second pressure absorption element has on its radial outer edge a collar projecting in the direction of the second damping element and/or one or more hooks projecting in the direction of the first damping element, which collar or one or more hooks engage around the second damping element.

10. The decoupling element according to claim 1, wherein one or more of the following comprises metal: the sleeve, the first pressure absorption element, the second pressure absorption element, the locking disc, a further locking disc, the first damping element, and the second damping element.

11. The decoupling element according to claim 1, wherein the first damping element and/or the second damping element comprises a metallic knitted wire mesh, which runs around the passage opening in a closed loop.

12. The decoupling element according to claim 1, wherein adjacent components of the lower part and/or adjacent components of the upper part are one or more of the following: produced in one part, connected together by a positive lock, by a material-formed bond, by a frictional lock, and welded.

13. The decoupling element according to claim 1, wherein a pot-like element with a base surface running coherently around the passage opening and a casing protruding from the base surface of the pot-like element on one side is arranged between the lower part and the upper part and running around the outer edge of the base surface in a closed loop.

14. The decoupling element according to claim 13, wherein the base surface of the pot-like element forms the locking disc.

15. The decoupling element according to claim 13, wherein the inside of the sheath and the base of the pot-like element enclose an angle of between 45° and 135°.

16. The decoupling element and heat shield according to claim 1, wherein the heat shield comprises at least one shielding layer which has at least one passage opening for the fastener, the decoupling element arranged in the passage opening, with the one or more of sleeve, the first damping element, the second damping element, and the locking disc extending through the passage opening for the fastener.

17. The decoupling element and heat shield according to claim 16, wherein the decoupling element is fixed in the passage opening of the shielding layer such that in the non-firmly mounted state of the heat shield, applies for the force F necessary for displacement of the decoupling element relative to the shielding layer which takes place perpendicularly to the axial direction, wherein F≤100 N.

18. A decoupling element for fastening a heat shield:
the heat shield comprising a passage opening for a fastener and has an axial passage direction; and
the decoupling element comprising:
a middle part containing a sleeve with a first and a second axial end portion,
a lower part arranged adjacent to the first axial end portion of the sleeve, with a first pressure absorption element which, along the axial direction, has a first side for resting against a component or a part of a fastening element, and a second side located opposite the first side,
a first damping element arranged on the second side of the first pressure absorption element,
an upper part arranged adjacent to the second axial end portion of the sleeve, with a second pressure absorption element which, along the axial direction, has a first side for resting against a component or a part of a fastening element, and a second side located opposite the first side, and
a second damping element arranged on the second side of the second pressure absorption element, and a locking disc which is arranged on the second side of the second pressure absorption element; and
the fastener passing through the lower part, the middle part, the upper part, the first damping element, and the second damping element;
wherein at least in one portion of the sleeve along the axial direction, the external diameter of a cross-section of the sleeve perpendicularly to the axial direction, at least along the outer edge of the passage opening, is larger, completely or in portions, than the internal width of the passage opening in the locking disc, and the locking disc has protrusions which extend radially inward toward the sleeve and are bent away from a plane of the locking disc, wherein the locking disc is a clamping disc, a clawed disc, or a latching disc which is clamped, clawed, or latched with the sleeve.

* * * * *